Feb. 5, 1952 G. E. BOCKRATH 2,584,667
GUST ALLEVIATING CONTROL MEANS FOR AIRPLANES
Filed Feb. 14, 1947 2 SHEETS—SHEET 1
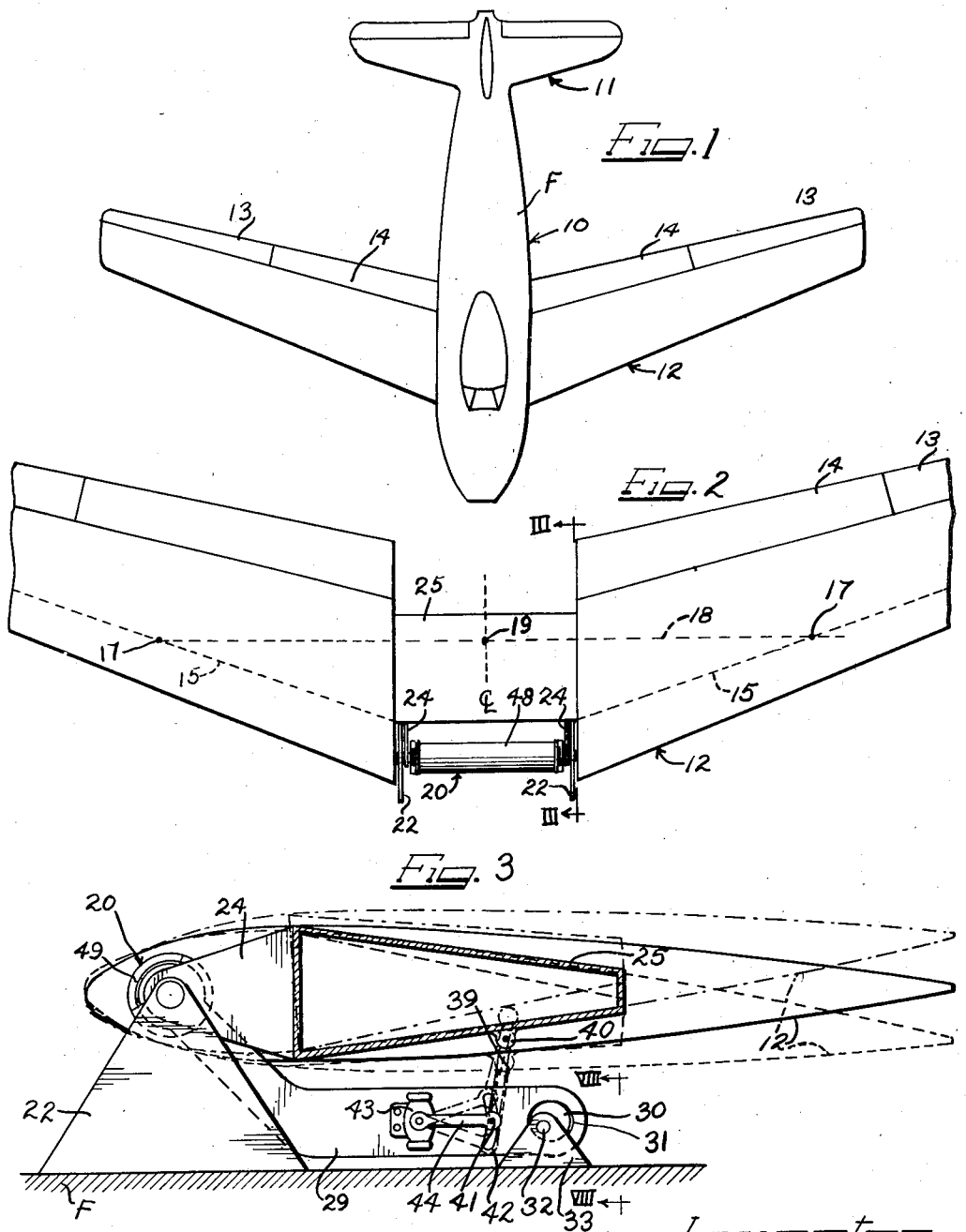
Inventor
George E. Bockrath

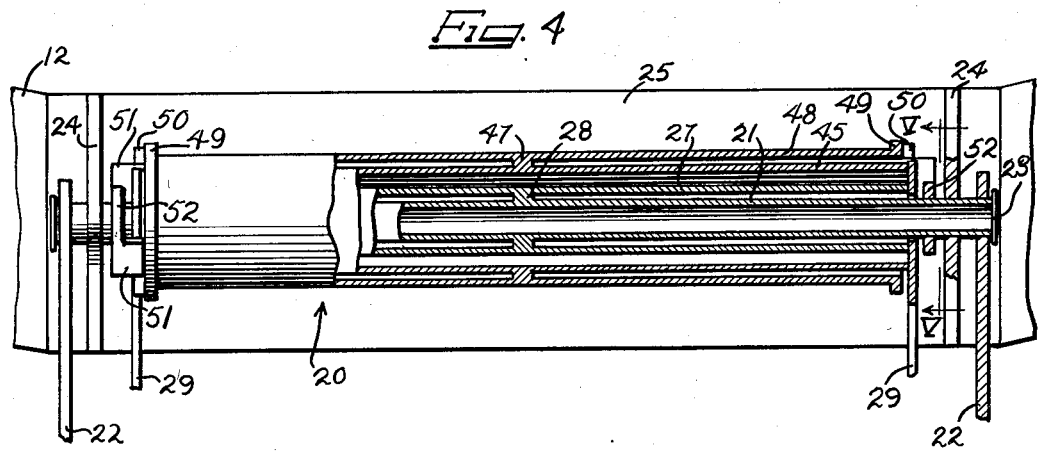
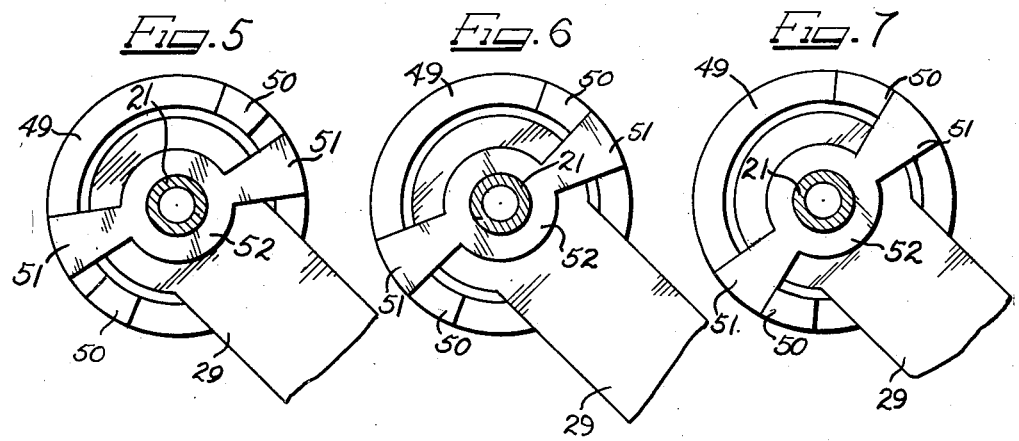
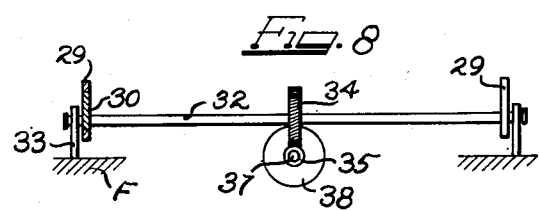

Patented Feb. 5, 1952

2,584,667

UNITED STATES PATENT OFFICE 2,584,667

GUST ALLEVIATING CONTROL MEANS FOR AIRPLANES

George E. Bockrath, Long Beach, Calif.

Application February 14, 1947, Serial No. 728,608

20 Claims. (Cl. 244—38)

This invention relates to improvements in airplane construction, and more particularly concerns new and improved means for alleviating the disagreeable and detrimental effects of up or down gusts encountered by an airplane in flight.

Probably the most disagreeable experience to which a person occupying an airplane during flight is subjected is that which results when the airplane passes through gusty air. The sudden up and down accelerations of the airplane due to the gusts present serious problems for the pilot because of the great difficulty in maintaining the airplane on even keel and on its course and are the usual direct cause of air sickness.

In addition, the detrimental effects of up and down gusts upon the airplane structure are of major consequence. Gust loads are the dominant factor in the fatigue life of the heavier types of airplanes, such as transports and bombers. The acceleration caused by encountering a gust becomes progressively greater as the speed increases. Therefore, a high speed airplane is very rough riding and is subject to rapid changes of stresses when flying in rough air. The frequency of gusts is inverse to airplane size, and, therefore, small airplanes encounter more gusts which produce a given acceleration than do larger airplanes.

Occasionally an airplane flying at very high speed is seriously damaged, or even destroyed, by inadvertent maneuvers. Such maneuvers result from inadvertent and excessive deflection of the elevators, which may result from unstable aerodynamic forces on the elevator, and which may suddenly develop at very high speed. Furthermore, the wing of an airplane moving at velocities approaching the speed of sound will be subjected to loads on the order of 15 or more times the weight of the airplane upon passing through a 50-foot per second up-gust. In consequence, the structural weight of airplanes which are to be operated at extremely high speeds is, in the conventional constructions, an important useful load reducing and power consuming factor in large measure due to the requirements for reenforcement to withstand gust stresses or loads.

An important object of the present invention is to provide new and improved gust alleviating means for airplanes which will overcome to a substantial extent, if not altogether, the disagreeable up and down accelerations of an airplane due to up and down gusts encountered in flight, and which will also greatly reduce the stresses and loads imposed by the gusts.

Another object of the invention is to provide a novel manner of mounting an airplane wing to alleviate the effects of up or down gusts.

A further object of the invention is to provide improved aerodynamic control means which will function to maintain an airplane in substantially level flight in gusty air.

Still another object of the invention is to provide novel means for hinging an airfoil for controlling an airplane in flight through gusty air.

Yet another object of the invention is to provide a spring assembly which will function to eliminate substantially the disagreeable effects of down-gusts in the operation of an airplane and will to a desirable degree reduce the undesirable effects of up-gusts.

It is also an object of the invention to avoid the damaging effects of inadvertent maneuvers while an airplane is flying at high speeds.

Other objects, features and advantages of the present invention will be readily apparent from the following detailed description of a preferred embodiment thereof taken in conjunction with the accompanying two sheets of drawings, disclosing said embodiment more or less schematically, and in which:

Figure 1 is a top plan view of an airplane incorporating the features of the invention;

Figure 2 is an enlarged fragmentary top plan view of the main wing of the airplane, separate from the fuselage;

Figure 3 is an enlarged transverse sectional view taken substantially along the line III—III of Figure 2;

Figure 4 is an enlarged fragmentary front elevational view of the wing structure and the gust alleviating control means, with certain parts broken away and in sections to reveal details of structure;

Figure 5 is a fragmentary transverse view taken substantially along the line V—V of Figure 4;

Figures 6 and 7 are the same as Figure 5, but showing the parts in different relative operative relationship; and Figure 8 is a vertical sectional view taken as though looking in the direction of the arrows on the line VIII—VIII of Figure 3, and with certain parts broken away and in section for the purpose of revealing structural details.

By way of illustration, the invention is disclosed in association with a jet propelled airplane 10 including a fuselage F having any preferred tail structure 11, and a main wing assembly 12 comprising left and right sections equipped with the customary ailerons 13 and flaps 14. It should be understood, of course, that the airplane 10 is merely representative of heavier than air flying machines in general, and that the principles of the present invention are adaptable to many different types of airplanes including load-carrying, pleasure and training crafts, and various fighter types of aircraft.

Described generally, gust alleviation is effected by mounting of the main wing assembly 12 to swing bodily up and down about a hinge axis adjacent to the leading edge of the wing structure. Thereby, the aerodynamic attitude of the wing structure is adapted to adjust automatically to compensate for gust conditions encountered in flight. Best results are attained where the mean aerodynamic center of the wing structure is near or coincident with the center of percussion of the wing, and this is brought about by the swept back design of the wing substantially as shown.

The sweep-back of the wing 12 is so organized that, referring to Figure 2, the aerodynamic center will be quite far back on the root chords of the wing sections and a considerable distance back of the wing structure hinge line through the forward part of the root chords and about which the wing structure rotates relative to the fuselage for changes in angle of attack. Thus, the broken lines 15 indicate the locus of aerodynamic centers of the wing cross-sections or chords, and the respective points 17 thereon indicate the mean aerodynamic centers of the wing sections. A line 18 projected through the aerodynamic center points 17, normal to the airplane center line, crosses the center line at a point 19 which represents the mean aerodynamic center of the wing of the airplane and as a matter of ideal coincidence, also represents the center of percussion of the wing. It will, of course, be understood that for various wing designs the mean aerodynamic center and the center of percussion may vary slightly in a front-to-rear direction, but should be as nearly as practicable coincident.

In the absence of such coincidence, as in wings not possessing sweep back, there will be a lag of response of the mechanism. Therefore, in addition to a large impact load increment at the hinge caused by gusts, there will be a lag of motion in such wings, and the resulting load increment will be greater. In other words, a gust will produce a maximum load increment before the wing can swing sufficiently to produce substantial alleviation of the gust.

There must, of course, be a substantial control over the swinging of the wing assembly 12 to maintain the same in proper attitude and to control the varying angles of attack demanded for alleviating the effects of up and down gusts. According to the present invention, this is accomplished by the provision of control spring means which may form part of the hinge structure of the wing assembly. In a desirable form, the spring structure may comprise a torque tube assembly 20 made from a material or combination of materials having appropriate modulus or moduli of elasticity.

Referring to Figures 3 and 4, the torque tube assembly 20 includes a relatively small diameter center tube 21 having the opposite ends thereof extending substantially beyond the opposite ends of the general torque spring assembly and providing a hinge axle journaled in appropriate respective brackets 22 fixedly supported by the airplane fuselage F. The extremities of the axle torque tube 21 may be equipped with suitable means such as retainer flanges or caps 23 to avoid end play relative to the supporting brackets 22.

The wing structure 12 is secured fixedly to the axle tube 21 adjacent to the brackets 22 by means of respective forwardly extending brackets 24 which are rigid with a spar structure 25 connecting the two symmetrical left and right wing sections of the wing structure.

To restrain the torque tube 21 against free rotation and to anchor the same for torsional springing, an end anchored, concentrically encircling torque tube 27 of larger diameter and somewhat shorter is connected integrally to the axle torque tube 21 at the longitudinal centers thereof, as shown at 28. The ends of the torque tube 27 are secured fast to respective attitude controlling lever arms 29, which preferably extend rearwardly under the wing structure and are adjustably connected to the fuselage F. Thus, rotation of the opposite symmetrical portions of the central torque tube 21 responsive to up swinging movement of the wing 12 is resiliently resisted by the encircling torque tube 27, the ends of which are held stationary by the control levers 29.

The torque tube assembly 21—27 is pre-torque-loaded. Thus, it always urges the wing 12 to swing downwardly. Aerodynamic lift urges the wing to swing upwardly, and in normal unaccelerated flight a state of balance exists.

By swinging the control levers 29 about the axis of the torque tube assembly the attitude of the wing can be adjusted for various flight conditions. In the present instance, this is accomplished by having the end portions of the levers 29 extend to an appropriate extent under the spar structure 25 and having respective eccentrics 30 operating in longitudinally elongated follower slots or apertures 31 adjacent to the ends of the levers. As best seen in Fig. 8, the eccentrics 30 may be mounted fixedly upon a common shaft 32 journaled adjacent to its ends in appropriate brackets 33 carried by the fuselage F. Means such as a driven worm wheel 34 fast on the shaft 32 meshes with a driving worm 35 on a shaft 37 adapted to be selectively actuated by a drive motor 38. Thus, by operation of the motor 38, the shaft 32 can be rotated to turn the eccentrics 30 and thus swing the control levers 29 clockwise or counter-clockwise within certain limits for correspondingly turning the torque tube assembly and thereby adjust the attitude of the wing 12 through its fixed securement to the torque tube assembly. Appropriate controls for operation of the motor 38 may, of course, be conveniently located within the fuselage for operation by the pilot.

Since the connected torque tubes 21 and 27 are of relatively small diameter, their relatively mild torsional spring resilience permits the wing a substantial range of hinge movements about the axis of the axle tube 21 to assume various angles of attack in response to gust or inadvertent-maneuver-imposed loads.

For practical purposes it is desirable to limit the extremes of swinging movement of the wing 12. For this purpose, means such as a respective link 39 is pivotally secured adjacent to each end of the spar assembly 25, as for example, to a link boss 40. The link 39 is provided at its opposite end with a pin 41 adapted to work in a limit slot 42 extending generally vertically and arcuately in the adjacent control lever 29. Engagement of the limit pin 41 at the opposite ends of its respective slot 42 acting as stops limits the swinging of the wing 12 between upper and lower extremes as indicated in the dot-dash and dash outline positions thereof, respectively, in Figure 3, the full line position being substantially the mean normal flight plane.

To prevent flutter in the wing, suitable vibration and flutter dampers 43, having connecting arms 44 may be connected to the limit pins 41 of the respective control links and may be mounted upon the respective control levers 29. Through this arrangement, the airplane wing may move relatively freely during operation throughout a substantial pivotal range and vibrations and flutter are dampened throughout such range.

It is desirable to alleviate gust loads almost entirely, but because the wing is frequently subjected to increased loads during normal maneuvers, as in turning, it is desirable that the wing be somewhat stiffer in upward swinging. Accordingly, the torsion spring assembly 20 includes additional means for controlling upward swing of the airplane wing 12 which will act in supplement to the torsion spring tubes 21 and 27, while the torsion spring afforded by the tubes 21 and 27 acts alone for relatively mildly urging movement of the wing to the relatively increased angle of attack to compensate for the effects of down-gust. To this end, a torque tube spring unit of larger diameter than the torque tube 27 is disposed in concentric spaced relation thereabout and includes an inner torque tube member 45 which is secured at its respective ends fixedly to the control levers 29 and is intermediately connected through means such as a centrally disposed integral spacer collar 47 with a concentrically spaced larger diameter outer torque tube 48. The ends of the torque tube 48 are free and carry respective rigid end flanges 49.

At diametrically opposite points thereon, the respective collars 49 have generally axially extending abutment lugs 50 (Figs. 4 and 5). In normal flight and absence of gusts, with the wing 12 in substantially the position shown in full outline in Fig. 3, the lugs 50 are engaged by arm-like lugs 51 extending diametrically from a respective collar 52 secured to the axially outwardly protruding end portions of the axial torque tube 21 (Fig. 6). Thus, during ideal aerial conditions, during normal flight, the torque tube assembly 21—27 is preferably twisted by a torque equal approximately to the weight of the sprung portion of the airplane times the distance from the center of gravity thereof to the hinge axis, and the torque tube assembly 45—48 is preferably only slightly torsionally stressed.

When an up-gust is encountered, the force thereof causes the wing 12 to swing up about its hinge, whereupon the hinge torque tube 21 is additionally twisted and simultaneously therewith and supplementary thereto the outer torque tube 48 is placed under torsional stress by the action of the arm lugs 51 against the end flange lugs 50 (Fig. 7).

In response to down-gusts, the wing 12 is urged to swing downwardly about its hinge by the spring assembly 21—27 to an increased angle of attack tending to compensate for the decreased lift occasioned by the down-gust force. Such downward swinging movement is normally urged only by the hinge torque tube assembly 21—27, which, being relatively sensitive to torsional deflection urges the wing to assume the increased angle of attack relatively quickly. In such down-gust movement of the wing, the arm lugs 51 leave the end flange lugs 50, as seen in Fig. 5, and the torque tube 48 remains idle. Upon passing beyond the down gust, the restored lift of the wing promptly returns the wing to the normal flight attitude.

Prior to take-off and flight, the wing structure 12 of the airplane swings down gravitationally and under the torque initially in the tube assembly 21—27 to its idle position, as represented by the dash outline in Fig. 3. Due to the lack of relative load-sustaining wind, the static weight of the wing and the spring assembly 21—27 holds the wing down against the stops provided by the link pin slots 42.

During the take-off run of the airplane, the effect of the relative wind attacking the wing structure 12 at its mean aerodynamic center results in upward swinging of the wing until substantial flight balance is attained, as substantially represented by the full line position of the wing in Fig. 3. In this position, of course, the torsion spring afforded by the centrally connected outer torque tubes 45 and 48 then becomes active through engagement of the arm lugs 51 with the end flange lugs 50 to resist upswing of the wing while the airplane is in level flight through still air (Fig. 6). Thus, the airplane wing structure 12 is maintained in substantial aerodynamic balance during flight but is readily adjustable with a substantial degree of sensitivity to variable aerodynamic conditions so as to avoid undesirable deviations from level flight.

During take-off and landing operations, where relatively high angle of attack is in order, the control arms 29 may be depressed by operation of the adjustment eccentrics 30. During flight, or where relative wind conditions during take-off or landing as the pilot's judgment demand, the control arms 29 may, of course, be adjusted by appropriate turning of the adjustment eccentrics 30 to effect any particular adjusted angle of attack permitted by the full range of adjustment of the control arms 29.

When the airplane encounters a down-gust, wherein the normal tendency, depending upon the velocity of the down-gust, is to reduce the lift toward zero or even to a negative value or download, the wing assembly 12 promptly swings down to a substantially increased angle of attack and thus minimizes the loss of lift. Since the increased angle of attack the torsion spring afforded by the torque tubes 21 and 27 is under lessened torsional stress, the wing assembly 12 quickly resumes its normal flight angle when the down gust has been passed and the lift of the wing is restored.

Where during level flight, the speed and angle of the relative wind is such as to act upon the wing assembly 12 aerodynamically to place both of the springs afforded by the torque tubes 21 and 27 and the torque tubes 45 and 48 under torsion, both of these springs operate for initially swinging the wing toward increased angle of attack when down gusts are encountered. However, the outer spring afforded by the torque tubes 45 and 48 quickly becomes idle and then only the inner of the springs afforded by the torque tubes 21 and 27 becomes active to urge the swing of the wing assembly toward the greater angle of attack.

Upon encountering an up-gust the upswing of the wing assembly 12 is resisted, however, by the combined torsion spring action of the torque tube assemblies 21 and 27, and 45 and 48 (Fig. 7), thus tending to compensate for or equalize the suddenly increased lift by the decrease in angle of attack of the wing. This at least smooths out the flight path of the airplane, if not altogether maintaining it at the preferred altitude. Upon leaving the up-gust, the wing is returned rapidly by the spring assembly to substantially normal angle of attack.

It is not intended to state, of course, that the present invention will necessarily keep the airplane at a precise altitude in gusty air, but it will avoid up or down acceleration due to gusts and any gust-induced variations in altitude will be gradual and easy and without detrimental and disagreeable effects on the plane or occupants.

In addition to the greatly improved riding comfort, the use of the gust-alleviating means of the present invention reduces the stress increment to a very material extent. As a result, great savings in the structural weight of airplanes can be effected, especially in airplanes to be operated at extremely high speeds. For example, as pointed out hereinbefore, the wing structure of an airplane moving at velocities approaching the speed of sound will be subjected to loads on the order of 15 or more times the weight of the plane upon passing through a 50-foot per second up-gust. When equipped with the present gust-alleviating means, the wing of such an airplane will experience a load increment of approximately only one-tenth as much.

Where in conventional airplane construction, elastic bending or twisting of a swept back wing is relied upon for partial gust-alleviation, a short gradient gust will not be materially alleviated because of lag of response. Also, if the structure is flexible enough to bring about alleviation of long gradient gusts, it will likewise be flexible enough to be subject to reversal of aileron control and thus the airplane will possess unsatisfactory aileron control characteristics. These disadvantages are avoided by the present invention where the airplane wings may be rigid to bending and torsion, since gust alleviation is effected by the hinged mounting of the wing. With the swept back formation of the wing structure to effect substantial coincidence of the aerodynamic center and the center of percussion, the inertia of the wing structure substantially resists the gust load increment and the hinge of the wing is virtually free from any load increment in excess of that required to twist the spring tubes as the wing swings. This is an important factor in rendering feasible the use of torsion spring hinging for the airplane wing. Furthermore, the torque tube spring hinge structure is adapted to be of relatively lightweight and of small size and adapted to occupy space in the fuselage which is not ordinarily usable for passenger or cargo purposes.

Although a more or less ideal or generalized illustration of the mean aerodynamic center and center of percussion has been shown as applying more especially during sub-sonic velocities, that is aft at about the 25% point on the root chord of the airfoil mass, such centers will, of course, shift further aft at super-sonic velocities to perhaps as far back as near the 50% point due to the fall in static pressure on the upper surface of the airfoil and the resulting lift from impact of the incident air against the bottom surface.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an airplane having a fuselage and a main wing structure including rigidly connected left and right wing sections, means hingedly connecting the wing structure to the fuselage forwardly of the aerodynamic center of the wing structure so as to render the wing swingable about the hinge axis in response to up and down gusts in flight, said means including a spring structure operative to control swinging of the wing structure about the hinge axis upon encountering a gust during flight, said spring structure including a torsion spring unit connected operatively to the wing structure and to the fuselage and acting normally to maintain the wing structure in a predetermined operative position relative to the fuselage.

2. In an airplane having a fuselage and a unitary main wing structure, means hingedly connecting the wing structure to the fuselage forwardly of the aerodynamic center of the wing structure so as to render the wing swingable about the hinge axis in response to up and down gusts in flight, said means including a spring structure operative to control swinging of the wing structure about the hinge axis upon encountering a gust during flight, said spring structure including a torque tube serving as the hinge axis and including a connection with the fuselage for holding the torque tube under torsional stress in various attitudes of the wing structure.

3. In combination in an airplane having a fuselage and a unitary main wing structure, means hingedly mounting the wing structure on the fuselage to permit up and down swinging of the wing structure responsive to up-gusts and down-gusts during flight, said means including resistance structure comprising a pair of torsion spring assemblies, and means for causing both of the torsion spring assemblies to be effective to resist upward swing of the wing by up-gusts, one of the torsion spring assemblies being effective alone to urge downward swing of the wing responsive to down-gusts.

4. In an airplane including an airfoil, a hinge mounting for the airfoil disposed forwardly of the aerodynamic center of the airfoil so as to render the airfoil swingable about the hinge axis in response to up and down gusts in flight, said hinge mounting including a resilient torque tube resistance structure for yieldably controlling the swinging of the airfoil.

5. In an airplane, a wing structure, and a horizontal hinge mounting for the wing structure having the axis thereof back of the leading edge of the root chord and forwardly of the aerodynamic center of the wing structure, said hinge mounting including a pair of springs jointly active to resist swinging deflection of the wing structure in one direction and one of said springs being active independently of the other for urging swinging movement of the wing structure in the opposite direction.

6. In an airplane, a wing structure, a horizontal hinge mounting for the wing structure having the axis thereof back of the leading edge of the root chord and forwardly of the aerodynamic center of the wing structure, said hinge mounting including a pair of torsion spring units jointly active to resist swinging deflection of the wing structure in one direction and one of said torsion spring units being active independently of the other for urging swinging movement of the wing structure in the opposite direction, and means for adjusting the torsion spring units and thereby the attitude the wing structure will assume in normal flight.

7. In a torque tube assembly adapted for controlling swing movements of a hingedly mounted airfoil, a first pair of concentric torque tubes centrally rigidly connected and free for relative torsional movement throughout the remainder of their lengths, and a second pair of torsionally connected torque tubes of larger diameter and disposed concentric with the first mentioned pair of torque tubes, one of the second pair of torque tubes being connected fixedly at its ends to the ends of one of the torque tubes of the first pair of torque tubes.

8. In a torque tube assembly adapted for controlling swing movements of a hingedly mounted airfoil, a first pair of concentric torque tubes centrally rigidly connected and free for relative torsional movement throughout the remainder of their lengths, and a second pair or torque tubes of larger diameter and disposed concentric with the first mentioned pair of torque tubes, one of the second pair of torque tubes being connected fixedly at its ends to the ends of one of the torque tubes of the first pair of torque tubes, the remaining torque tubes of said pairs of tubes including means for separable torsional interconnection at their ends.

9. In combination in a control spring arrangement for hingedly mounted airfoils, two concentric pairs of torque tubes, the tubes of each pair being fixedly connected at their centers and being free throughout the remainder of their opposite longitudinal portions for relative torsional action, the outer tube of the inner pair of torque tubes being fixedly connected at its ends to the ends of the inner tube of the outer pair of torque tubes, means for connecting said connected ends of said tubes to a relatively stationary part of an airplane assembly, and separably interengageable structure on the outer end portions of the innermost tube of the inner pair of torque tubes and the outermost tube of the outer pair of torque tubes.

10. In combination in a torque tube spring assembly and a hinged airfoil controlled thereby, a central torque tube having the ends thereof extended beyond the rest of the assembly to provide hinge trunnions, rigid connections between said trunnions and the airfoil, and a second torque tube structure concentric with the first mentioned torque tube structure and arranged to be connected with a relatively stationary part of an airplane assembly, said first mentioned torque tube structure and said second mentioned torque tube structure including means for connecting the torque tube structures to act together when the airfoil tends to swing in one direction and for disconnecting the torque tube structures when the airfoil swings in the opposite direction.

11. In combination in an airplane assembly including a fuselage and a main wing structure comprising left and right wing sections and rigid spar means connecting the wing sections substantially rigidly together aft of the leading edge of the wing structure, means hingedly connecting the wing structure adjacent its leading edge to the fuselage substantially forwardly of the connecting spar means and of the mean aerodynamic center of the wing structure including a spring assembly for controlling the swinging movement of the wing, said spring assembly being conditioned to maintain the wing structure in a predetermined flight attitude, and means connected to the spring structure for adjusting the same to vary the flight attitude, said spring structure comprising a resilient torque member serving also as the hinge axis of the wing, and said adjusting means comprising a pair of arms connected to said torque member.

12. In combination in an airfoil adapted to be hingedly mounted adjacent its leading edge and cluding resistance means for controlling swinging movements of the airfoil from a mean flight plane, means for controlling said flight plane comprising a pair of adjustment arms relative to which the airfoil is swingable, and a connection between said adjustment arms and the airfoil for limiting the maximum swinging movement of the airfoil relative to said mean flight plane.

13. In combination in an airfoil adapted to be hingedly mounted adjacent its leading edge and including resistance means for controlling swinging movements of the airfoil from a mean flight plane, means for controlling said flight plane comprising a pair of adjustment arms relative to which the airfoil is swingable, and a connection between said adjustment arms and the airfoil for limiting the maximum swinging movement of the airfoil relative to said mean flight plane, said connection including vibration damper means for controlling vibrations and flutter.

14. In a torque tube assembly adapted for controlling swinging movements of a hingedly mounted airfoil, a first pair of concentric torque tubes operatively connected for relative torsional movement, a second pair of torsionally connected torque tubes of larger diameter and disposed in encircling relation to the first mentioned pair of torque tubes, one of the second pair of torque tubes being connected at each of its ends to the corresponding end of one of the torque tubes of the first pair of torque tubes.

15. In combination in an airplane assembly including a fuselage and an airfoil hingedly mounted on the fuselage and responsive to up or down gusts encountered by the airplane in flight for automatically varying the angle of attack of the airfoil to alleviate the effects of such gusts, a torque tube spring structure connected to the airfoil and to the fuselage and including a torque tube spring for resisting up gust movement and assisting down gust movement of the airfoil, and another torque tube spring operative to supplement the resistance of the first mentioned torque tube spring to swinging movement of the airfoil in response to up gusts.

16. In combination in an airplane construction comprising a supporting structure and an airfoil structure hingedly mounted on said supporting structure, a spring assembly for controlling swinging movements of the airfoil comprising a torsion spring for resisting movement of the airfoil in one direction and assisting movement in the opposite direction, a second torsion spring supplemental to the first mentioned torsion spring for resisting movement of the airfoil in said one direction, and means connected between said spring assembly and said supporting structure for varying the operative relationship of the spring assembly to said supporting structure to vary the attitude of the airfoil relative to said supporting structure.

17. In combination in an airplane construction, a fuselage, a main wing structure comprising left and right wing sections of swept back shape and in a rigid unit, and hinge means hingedly connecting the wing to the fuselage forwardly of the mean aerodynamic center and aft of the leading edge of the root chord of the wing, said hinge means including a torsion spring structure controlling hinged swinging movements of the wing automatically responsive to aerodynamic forces thereon including up and down gusts during flight of the airplane, said torsion spring structure including a torsion spring unit resiliently controlling the swinging of the wing during down gusts and a second torsion spring unit cooperating supplemental to said one spring unit to control swinging movement of the wing during up gusts.

18. In combination in an airplane assembly including a fuselage and a main wing structure, said wing structure comprising left and right wing sections of swept back shape in unitary substantially fixedly related association, and a hinge structure between the adjacent forward portions of said wing sections and substantially forwardly relative to the mean aerodynamic center of the wing structure pivotally connecting the wing structure to the fuselage and thus rendering the wing structure pivotally responsive to up and down gusts during flight of the airplane, said hinge structure including means resiliently resisting gust-induced swinging movements of the wing structure.

19. In combination in an airplane assembly including a fuselage and a main wing structure, said wing structure comprising left and right wing sections of swept back shape in unitary substantially fixedly related association, and a hinge structure between the adjacent forward portions of said wing sections and substantially forwardly relative to the mean aerodynamic center of the wing structure pivotally connecting the wing structure to the fuselage and thus rendering the wing structure pivotally responsive to up and down gusts during flight of the airplane, said hinge structure including means resiliently resisting gust-induced upward swinging movements of the wing structure, the resilient resistance means being of predetermined downward swinging assistance effective upon the wing structure for down gusts and of predetermined increased resistance to up gust movement of the wing structure.

20. In combination in an airplane construction including a fuselage structure and a main wing structure, said wing structure comprising left and right wing sections of swept back shape, a spar joining said sections substantially fixedly together, a torsion hinge structure mounted on the fuselage substantially parallel with and forwardly of said spar, and a spaced pair of arms projecting forwardly from said spar and operatively connected to said torsion hinge for supporting the wing structure in flight attitude, said torsion hinge being automatically yieldable responsive to wind pressure against the wing structure for compensatory swinging of the wing structure up and down about the axis of the hinge structure under the resistance thereof to maintain the airplane in substantially level flight.

GEORGE E. BOCKRATH.

REFERENCES CITED

The following references are of record in the file of this patent:

UNITED STATES PATENTS

| Number | Name | Date |
|---|---|---|
| 785,323 | Nadrowski | Mar. 21, 1905 |
| 1,530,232 | Buttner | Mar. 17, 1925 |
| Re. 18,181 | Stelzer | Sept. 8, 1931 |
| 1,827,560 | Binckley | Oct. 13, 1931 |
| 1,857,694 | Righton | May 10, 1932 |
| 1,861,219 | Longren | May 31, 1932 |
| 1,949,787 | Dugan | Mar. 6, 1934 |
| 2,043,542 | Johnson | June 9, 1936 |
| 2,063,030 | Crouch | Dec. 8, 1936 |
| 2,103,590 | Lefevre | Dec. 28, 1937 |
| 2,128,060 | Spratt | Aug. 23, 1938 |
| 2,267,917 | Hickman | Dec. 30, 1941 |
| 2,362,224 | Roseland | Nov. 7, 1944 |
| 2,371,687 | Gerhardt | Mar. 20, 1945 |
| 2,406,588 | Cornelius | Aug. 27, 1946 |

FOREIGN PATENTS

| Number | Country | Date |
|---|---|---|
| 7,209 | Great Britain | 1909 |
| 649,150 | Germany | Dec. 23, 1937 |